US011662927B2

(12) United States Patent
Liu et al.

(10) Patent No.: US 11,662,927 B2
(45) Date of Patent: May 30, 2023

(54) REDIRECTING ACCESS REQUESTS BETWEEN ACCESS ENGINES OF RESPECTIVE DISK MANAGEMENT DEVICES

(71) Applicant: EMC IP Holding Company LLC, Hopkinton, MA (US)

(72) Inventors: Xiaochen Liu, Shanghai (CN); Ao Sun, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/364,784

(22) Filed: Jun. 30, 2021

(65) Prior Publication Data

US 2022/0334744 A1    Oct. 20, 2022

(30) Foreign Application Priority Data

Apr. 15, 2021 (CN) ......................... 202110406413.X (51) Int. Cl.
*G06F 3/06* (2006.01)

(52) U.S. Cl.
CPC .......... *G06F 3/0635* (2013.01); *G06F 3/0604* (2013.01); *G06F 3/0631* (2013.01); *G06F 3/0659* (2013.01); *G06F 3/0683* (2013.01)

(58) Field of Classification Search
CPC .... G06F 3/0635; G06F 3/0604; G06F 3/0631; G06F 3/0659; G06F 3/0683; G06F 3/067; G06F 11/2092; G06F 11/2033; G06F 11/2069; G06F 11/16; G06F 11/162; G06F 11/1616; G06F 11/201; G06F 11/2017; G06F 11/2005; G06F 11/2089; G06F 11/14–2092

See application file for complete search history.

(56) References Cited

U.S. PATENT DOCUMENTS 7,630,313 B2 * 12/2009 Batni .................... H04L 43/106
370/252
2005/0041788 A1 * 2/2005 Jan .......................... H04M 3/50
379/88.18

(Continued)

FOREIGN PATENT DOCUMENTS

EP          1845450 A2 * 10/2007 .......... G06F 11/0727

*Primary Examiner* — Charles Rones
*Assistant Examiner* — Hewy H Li
(74) *Attorney, Agent, or Firm* — Amin, Turocy & Watson, LLP (57) ABSTRACT

Embodiments that process data are described. For instance, a method includes receiving, at a first disk management device in a storage system, an access request for accessing data in a plurality of disks associated with the storage system. The method further includes determining whether a first access engine for accessing the plurality of disks in the first disk management device is available. The method further includes redirecting the access request to a second disk management device in the storage system if it is determined that the first access engine is unavailable, wherein a second access engine in the second disk management device is available to access the plurality of disks. By means of this method, effective data access can be performed when an access engine of a disk management device is unavailable, thus realizing a more stable access capability and improving the user experience.

20 Claims, 4 Drawing Sheets

(56) References Cited

U.S. PATENT DOCUMENTS

| | | | |
|---|---|---|---|
| 2005/0172097 A1* | 8/2005 | Voigt | G06F 3/067 |
| | | | 711/170 |
| 2005/0273645 A1* | 12/2005 | Satran | G06F 11/2033 |
| | | | 714/4.1 |
| 2015/0317091 A1* | 11/2015 | Hussain | G06F 3/065 |
| | | | 711/103 |
| 2019/0042151 A1* | 2/2019 | Yang | G06F 3/0683 |
| 2019/0102093 A1* | 4/2019 | Parnell | G06F 11/2007 |
| 2019/0356736 A1* | 11/2019 | Narayanaswamy | ......... |
| | | | G06F 11/1076 |
| 2020/0034043 A1* | 1/2020 | Szczepanik | G06F 11/2033 |

* cited by examiner

REDIRECTING ACCESS REQUESTS BETWEEN ACCESS ENGINES OF RESPECTIVE DISK MANAGEMENT DEVICES

RELATED APPLICATION

The present application claims the benefit of priority to Chinese Patent Application No. 202110406413.X, filed on Apr. 15, 2021, which application is hereby incorporated into the present application by reference herein in its entirety.

TECHNICAL FIELD

Embodiments of the present disclosure relate to the field of data processing, and in particular, to a method, an electronic device, and a computer program product for processing data.

BACKGROUND

With the development of storage technologies, increasingly more data is stored in storage systems, leading to increasingly higher requirements on the access performance of storage systems. In addition, compared with local storage systems, network-based storage systems have emerged. Network-based storage systems may be configured to store more data and information for user access.

In network-based storage systems, cloud storage, as a form of cloud service, has developed in recent years. Cloud storage is a cloud service with data storage as the core. During use, users do not need to understand the management and operation of storage devices, and can easily access data stored on the cloud through application software. However, there are still many problems that need to be solved in the process of implementing cloud storage.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

A method, an electronic device, and a computer program product for processing data are provided in embodiments of the present disclosure.

According to a first aspect of the present disclosure, a method for processing data is provided. The method includes receiving, at a first disk management device in a storage system, an access request for accessing data in a plurality of disks associated with the storage system. The method further includes determining whether a first access engine for accessing the plurality of disks in the first disk management device is available. The method further includes redirecting the access request to a second disk management device in the storage system if it is determined that the first access engine is unavailable, wherein a second access engine in the second disk management device is available to access the plurality of disks.

According to a second aspect of the present disclosure, an electronic device is provided. The electronic device includes at least one processor; and a memory coupled to the at least one processor and having instructions stored thereon, wherein the instructions, when executed by the at least one processor, cause the device to perform actions including: receiving, at a first disk management device in a storage system, an access request for accessing data in a plurality of disks associated with the storage system; determining whether a first access engine for accessing the plurality of disks in the first disk management device is available; and redirecting the access request to a second disk management device in the storage system if it is determined that the first access engine is unavailable, wherein a second access engine in the second disk management device is available to access the plurality of disks.

According to a third aspect of the present disclosure, a computer program product is provided, which is tangibly stored on a non-volatile computer-readable medium and includes machine-executable instructions. The machine-executable instructions, when executed, cause a machine to perform steps of the method in the first aspect of the present disclosure.

BRIEF DESCRIPTION OF THE DRAWINGS

The above and other objectives, features, and advantages of the present disclosure will become more apparent by describing example embodiments of the present disclosure in detail with reference to the accompanying drawings, and in the example embodiments of the present disclosure, the same reference numerals generally represent the same components.

The same or corresponding reference numerals in the various accompanying drawings represent the same or corresponding portions.

DETAILED DESCRIPTION

The embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be construed as "at least one embodiment." The terms "first," "second," and the like may refer to different or the same objects. Other explicit and implicit definitions may also be included below.

The principles of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the present disclosure, and are not intended to impose any limitation to the scope of the present disclosure.

A cloud storage system includes a plurality of disk management devices, and each disk management device includes a manager and a local storage server. The manager may be, for example, a data service component. The manager may be configured to send I/O requests to storage servers in the plurality of disk management devices. The storage server in each disk management device is only configured to manage a plurality of local disks connected to the disk management device. In this process, the storage server is responsible for providing the received sent I/O requests to a target disk among the plurality of disks connected to the disk management device. Then, each I/O request is executed on the target disk.

On each disk management device, the storage server uses a Transmission Control Protocol (TCP) to communicate with the disk management device.

However, in the current architecture, if a storage server is shut down for some reason, all disks at the disk management device will be immediately inaccessible. Therefore, all data stored on these magnetic disks will be considered lost, which will lead to many data protection operations, such as data recovery/rebalancing, and will result in major expenses for the entire system.

In order to solve the above problems, a network protocol specification based on a high-speed non-volatile storage interface (Non-Volatile Memory Express over Fabrics, NVME-oF) is introduced into the cloud storage system. In a basic NVMe-oF structure, a controller is assigned to each magnetic disk, and the controller processes a command encapsulation sent from a host in the disk management device.

Each access engine acts as a host in the basic structure of the NVMe-oF and is configured to create a queue pair connected to each controller on the magnetic disk. The access engine is, for example, a high-speed non-volatile memory (Non-Volatile Memory express, NVMe) engine. At this time, the access engine receives a data access request from the data service, and then sends the data access request to the corresponding magnetic disk. Compared with the storage server, the access engine can access all disks in the storage system.

However, if the access engine in a disk management device is terminated at this time, although the magnetic disk associated with the disk management device is still visible to the storage system and can be accessed by other disk management devices, the access engine on the disk management device will lose the connection with each magnetic disk since the access engine halts service. Therefore, all I/O requests generated by the manager of the disk management device cannot succeed. For example, if a client terminal sends requests to the disk management device, all requests will fail.

In order to solve at least the above and other potential problems, a method for processing data is provided in an embodiment of the present disclosure. In the method, an access request for accessing data in a plurality of disks associated with a storage system is received at a first disk management device in the storage system. Then, it is determined whether a first access engine for accessing the plurality of disks in the first disk management device is available. The access request is redirected to a second disk management device in the storage system if it is determined that the first access engine is unavailable, wherein a second access engine in the second disk management device is available to access the plurality of disks. By means of this method, effective data access can be performed when an access engine of a disk management device is unavailable, thus realizing a more stable access capability and improving the user experience.

Figure 1:
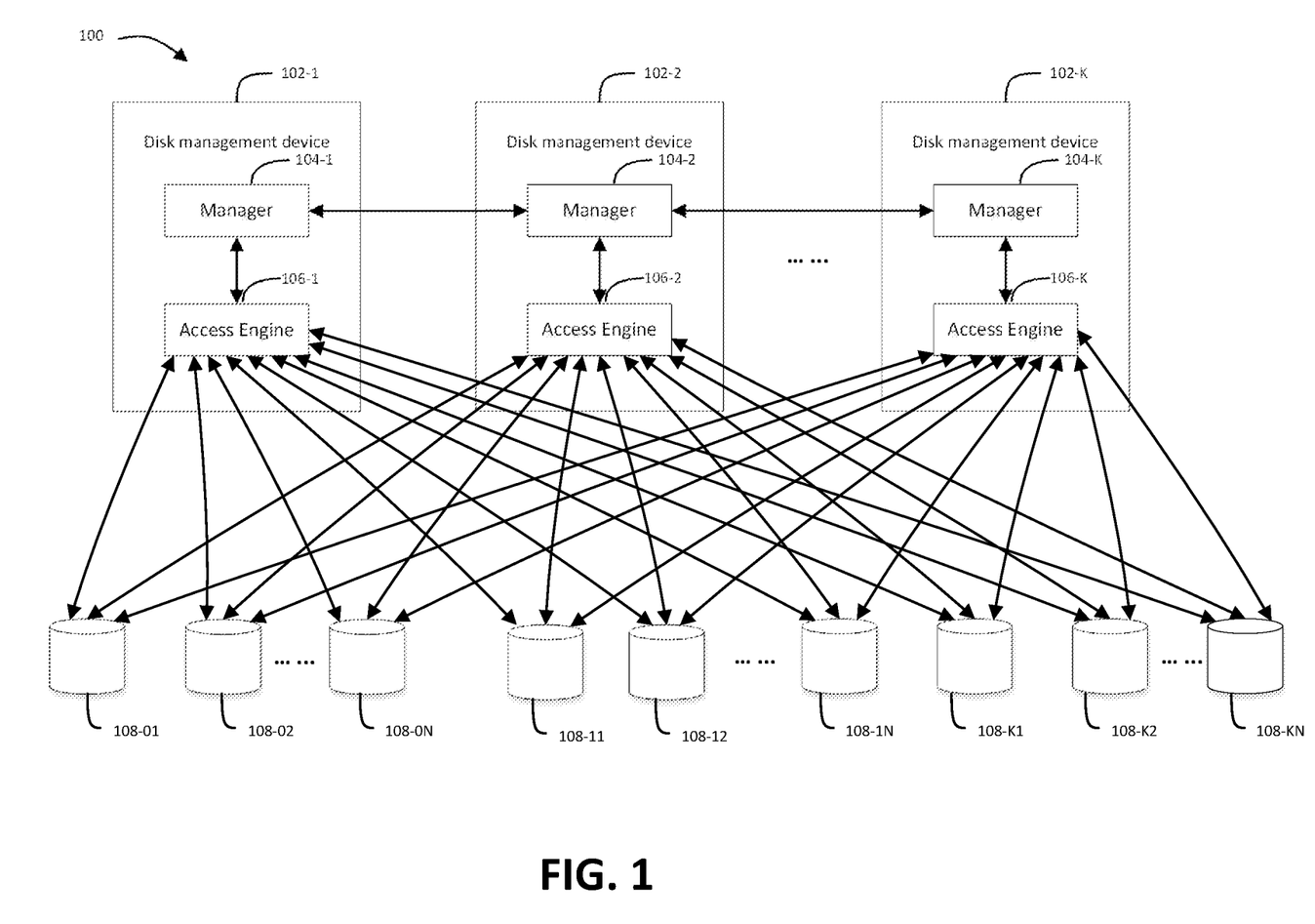
FIG. 1 is a schematic diagram of example environment 100 in which a device and/or method according to an embodiment of the present disclosure may be implemented.

The embodiments of the present disclosure will be further described below in detail with reference to the accompanying drawings. FIG. 1 is a block diagram of example environment 100 in which an embodiment of the present disclosure can be implemented. It should be understood that example environment 100 is described for illustrative purpose only and does not imply any limitation to the scope of the present disclosure.

As shown in FIG. 1, example environment 100 includes disk management device 102-1, disk management device 102-2, . . . , and disk management device 102-K, wherein K is a positive integer. For ease of description, the above disk management devices may also be collectively referred to as disk management device 102.

Disk management device 102 includes, but is not limited to, a personal computer, a server computer, a handheld or laptop device, a mobile device (such as a mobile phone, a personal digital assistant (PDA), or a media player), a multi-processor system, a consumer electronic product, a minicomputer, a mainframe computer, a distributed computing environment including any of the above systems or devices, etc.

Each disk management device 102 includes a manager and an access engine. For example, disk management device 102-1 includes manager 104-1 and access engine 106-1, disk management device 102-2 includes manager 104-2 and access engine 106-2, and disk management device 102-K includes manager 104-K and access engine 106-K. In order to facilitate the description, manager 104-1, manager 104-2, and manager 104-K may be collectively referred to as manager 104; access engine 106-1, access engine 106-2, and access engine 106-K may be collectively referred to as access engine 106.

In system 100, there may be N disks at each disk management device, and N is a positive integer. For example, disk management device 102-1 has disk 108-01, disk 108-02, . . . , and disk 108-0N; disk management device 102-2 has disk 108-11, disk 108-12, . . . , and disk 108-1N; and disk management device 102-K has disk 108-K1, disk 108-K2, . . . , and disk 108-KN. For the convenience of description, disk 108-01, disk 108-02, disk 108-0N, disk 108-11, disk 108-12, disk 108-1N, disk 108-K1, disk 108-K2, and disk 108-KN are collectively referred to as disk 108.

Each disk management device having N disks shown in FIG. 1 is only an example, rather than a specific limitation to the present disclosure. The number of disks at each disk management device may be different, and may be any suitable number.

Manager 104 may be configured to receive an access request from a user or a redirected access request from another disk management device.

In some embodiments, manager 104 determines whether the access request is an access request from the user or a redirected access request from another disk management device based on a type identification of the access request set in the received access request. In some embodiments, manager 104 determines whether the access request is an access request from the user or a redirected access request received from another disk management device based on whether the received access request includes an identification of the other disk management device. The above examples are only for describing the present disclosure, rather than specifically limiting the present disclosure. Those skilled in the art can set any suitable method to distinguish whether the access request is from the user or from another disk management device.

If the access request is a redirected access request from another disk management device, it can be directly determined that first access engine 106 is available, and the access operation is performed through first access engine 106.

If the access request is from the user, it is detected whether first access engine 106 for accessing the disk in first disk management device 102 is available. In some embodiments, manager 104 may monitor the state of a local access engine and states of access engines of other disk management devices. If the access engine is unavailable, the state flag thereof is set to unavailable. Therefore, it may be determined whether the access engine is available by detecting the state flag of the access engine. In some embodiments, manager 104 may acquire a list of unavailable access engines and a list of available access engines. Then, it may be determined whether the access engine is available by looking up the above table. The above examples are only for describing the present disclosure, rather than specifically limiting the present disclosure. Those skilled in the art may set any suitable method of determining whether the access engine is available.

In addition, manager 104 updates the access request received from the user. Alternatively or additionally, the update to the access request may also include adjusting the format of the access request.

The update to the access request is described below based on whether the access request is a write request or a read request. In an example, the received access request is a read request from the user. The read request includes an identification of the user and an identification of a file to be read. Manager 104 may acquire a list of identifications of stored files and corresponding storage locations. The storage locations include a disk identification and a storage location in the disk. Then, manager 104 searches the list for a storage location corresponding to the identification of the file to be read. Then, the obtained storage location is added to the read request to obtain an updated read request. For example, the storage location is added to the read request to generate an updated read request, or the storage location is substituted for a file identification in the read request to generate an updated read request. The above examples are only for describing the present disclosure, rather than specifically limiting the present disclosure.

In another example, the received access request is a write request from the user. The write request from the user includes an identification of the user and an identification and data of a file to be written. Manager 104 acquires a disk available to store data from a plurality of disks. A disc identification is then added to the write request to generate an updated write request. Alternatively or additionally, in order to ensure that the data is recoverable, a plurality of write requests corresponding to the updated write request may also be generated. Each corresponding write request includes the same file data, but is assigned a different disk identification for storage, thus forming a plurality of backups of the stored file data. The above examples are only for describing the present disclosure, rather than specifically limiting the present disclosure.

In some embodiments, after receiving the access request of the user, manager 104 first determines whether first access engine 106 is available, and then updates the access request if it is unavailable. Then, the updated access request is redirected to the second management device. If first access engine 106 is available, the access request is updated and then directly sent to the first access engine for processing.

In some embodiments, after receiving the access request of the user, manager 104 first updates the access request, and then determines whether first access engine 106 is available. If it is available, the updated access request is sent to the first access engine for processing, and if it is unavailable, the updated access request is redirected to the second management device.

In some embodiments, after receiving the access request of the user, if it is determined that the first access engine is unavailable, manager 104 does not update the access request, but directly redirects it to the second disk management device. If it is determined that the first access engine is available, the access request is then updated. Then, the updated access request is sent to the first access engine. The above examples are only for describing the present disclosure, rather than specifically limiting the present disclosure.

In some embodiments, when the first access engine is unavailable, manager 104 further determines an available management engine and its corresponding disk management device. Then, a disk management device is selected therefrom to be regarded as the second disk management device for redirecting the access request. Then, a manager of the second disk management device that has received the redirected access request sends the received redirected updated access request to its access engine, for performing the access operation. After the access operation succeeds, corresponding information is returned from the second management device to the first management device.

In some embodiments, the redirected access request received by the first disk management device is an updated access request. In some embodiments, the redirected access request received by the first disk management device includes an updated access request and a non-updated access request. Then, the two types of redirected access requests are distinguished according to identification information. When the redirected access request is an updated access request, the access request is processed directly. If the redirected access request is a non-updated access request, the access request may be updated, and then an operation on the updated access request may be performed. The above examples are only for describing the present disclosure, rather than specifically limiting the present disclosure.

By means of the above method, effective data access can be performed when an access engine of a disk management device is unavailable, thus realizing a more stable access capability and improving the user experience.

A block diagram of example environment 100 in which an embodiment of the present disclosure can be implemented is described in the foregoing with reference to FIG. 1. A flowchart of method 200 for processing data according to an embodiment of the present disclosure will be described below with reference to FIG. 2. Method 200 may be performed at disk management device 102 in FIG. 1 and any suitable computing device.

Figure 2:
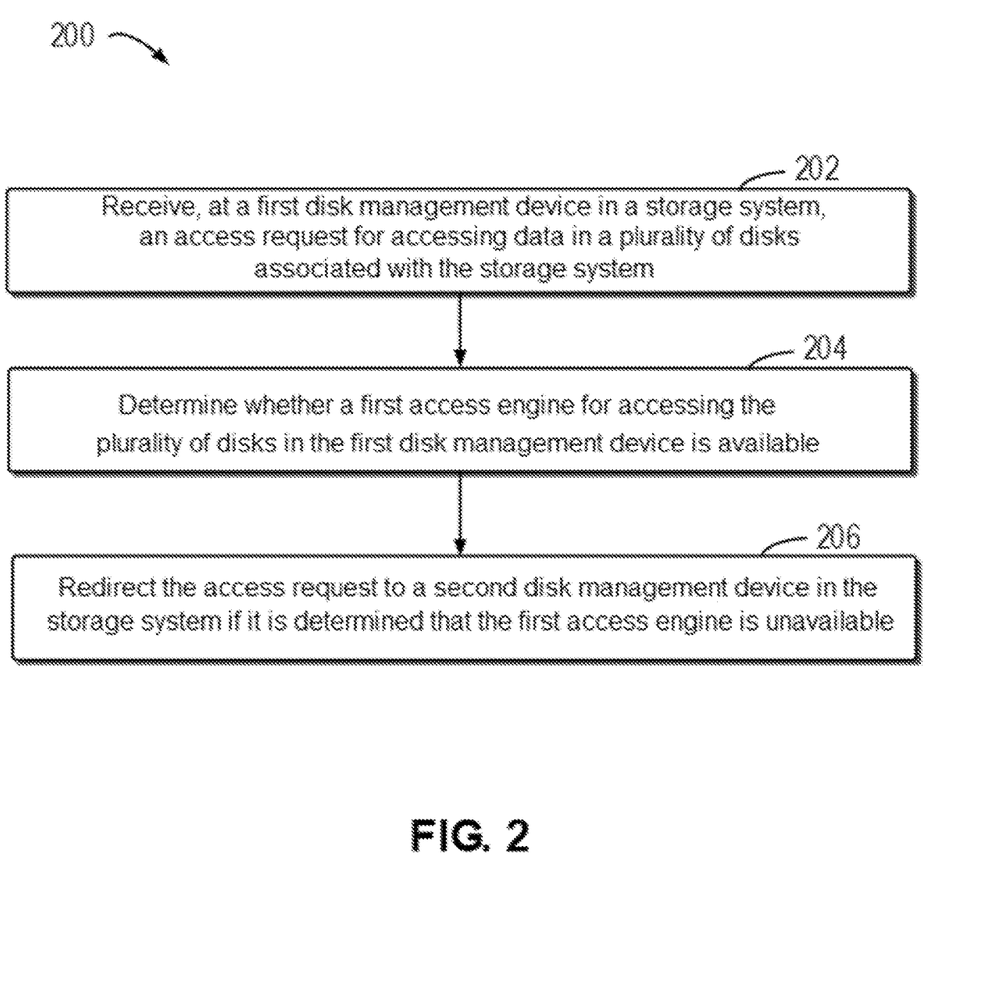
FIG. 2 is a flowchart of method 300 for processing data according to an embodiment of the present disclosure.

As shown in FIG. 2, at block 202, an access request for accessing data in a plurality of disks associated with a storage system is received at first disk management device 102 in the storage system. First disk management device 102 may be configured to receive an access request sent to it by a user or an access request redirected to first disk management device 102 from another management device.

At block 204, first disk management device 102 determines whether first access engine 106 for accessing a plurality of disks in first disk management device 102 is available. After first disk management device 102 receives the access request, it is determined whether the access engine in the disk management device can be used to access the plurality of disks in the storage system.

In some embodiments, disk management device 102 acquires state information of the first access engine, for example, disk management device 102 stores a state table of access engines of various disk management devices in the storage system. State information of the first access engine is determined according to the state table. Alternatively or additionally, an application for monitoring the state of the access engine is arranged in disk management device 102. If it is determined that the state information indicates that the first access engine has a fault, it is determined that the first access engine is unavailable. If no fault of the first access engine is indicated, it indicates that the first access engine is available. In this way, it can be quickly determined whether the access engine is available.

In some embodiments, disk management device 102 may determine the workload of first access engine 106. The workload of first access engine 106 is then compared with a threshold workload. If the workload exceeds the threshold workload, it is determined that the first access engine is unavailable. If the workload does not exceed the threshold workload, it is determined that the first access engine is available. By means of the above method, it can be quickly determined whether the access engine is available according to the workload.

In some embodiments, it may be determined first whether the first access engine is faulty. The workload is determined when the first access engine is not faulty, and the first access engine is determined to be available only when the first access engine is not faulty and the workload is within the threshold workload; otherwise, the first access engine is determined to be unavailable. The above examples are only for describing the present disclosure, rather than specifically limiting the present disclosure. Those skilled in the art may set any suitable method of determining whether the access engine is available.

In some embodiments, it may be determined whether the access request is a redirected access request from another disk management device or an access request from the user based on the type of the access request or whether the access request includes an identification of the other disk management device.

In an example, if it is determined that the access request includes an identification of a third disk management device in the storage system, it indicates that it is a redirected access request received from another disk management device. If there is no identification of the third disk management device, it indicates that it is an access request received from the user. In another example, the type of the access request identifies whether it is a redirected access request from another disk management device or an access request from the user. The above examples are only for describing the present disclosure, rather than specifically limiting the present disclosure. Those skilled in the art may set any suitable method of determining whether the access request is a redirected access request or an access request from the user.

When the access request is a redirected access request, it can be determined that the first access engine is available. In this way, it can be quickly determined whether the first access engine is available. When the access request is an access request from the user, it is determined whether the first access engine is available.

At block 206, first disk management device 102 redirects the access request to a second disk management device in the storage system if it is determined that the first access engine is unavailable, wherein a second access engine in the second disk management device is available to access the plurality of disks.

Figure 3:
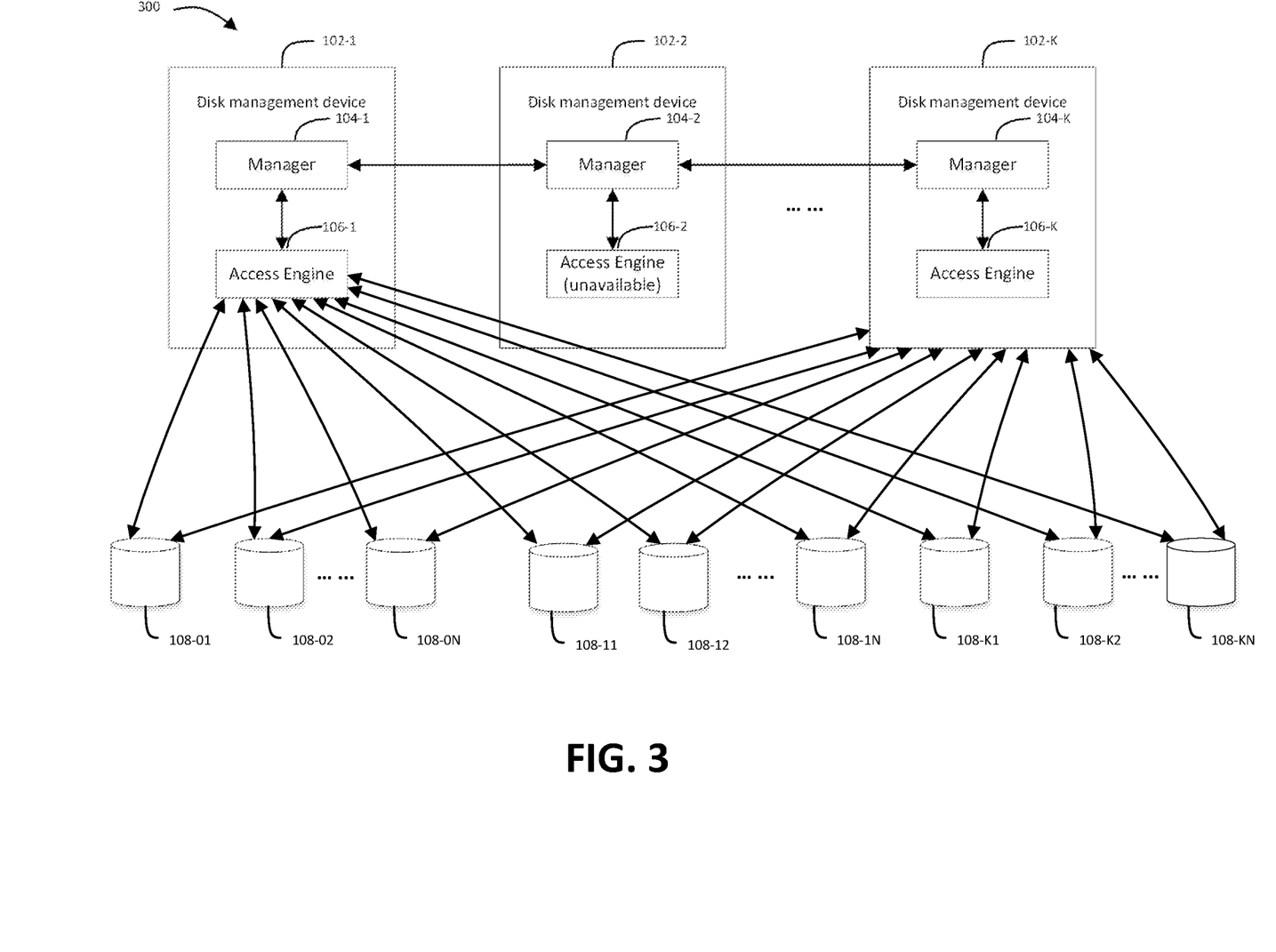
FIG. 3 is a schematic diagram of example environment 300 where an access engine is unavailable according to an embodiment of the present disclosure.

FIG. 3 is a schematic diagram of example environment 300 where an access engine is unavailable according to an embodiment of the present disclosure. As shown in FIG. 3, in example environment 300, if access engine 106-2 in disk management device 102-2 is unavailable, disk 108 cannot be accessed through access engine 106-2. Therefore, the access request received by disk management device 102 is redirected to a disk management device connected thereto.

Returning to FIG. 2 for description, if it is determined that the first access engine is available, the access request may be updated, and then the first access engine is used to process the access request.

In some embodiments, when the access request is an access request from the user and it is determined that first access engine 106 is unavailable, first disk management device 102 determines that there is a group of disk management devices in the storage system that have access engines available to access a plurality of disks. Then, the first disk management device selects a disk management device from the group of disk management devices and regards it as the second disk management device. In this way, the second disk management device configured to process the access request can be quickly determined.

In some embodiments, when the received access request is a read request from the user, the read request includes an identification of a file to be read. At this time, first disk management device 102 acquires a mapping relationship between an identification of a stored file and a storage location of the stored file. For example, a list of identifications of stored files and corresponding storage locations is acquired. Then, first disk management device 102 searches the mapping relationship for an identification of a target stored file corresponding to the identification of the file to be read. The read request is updated by adding a target storage location corresponding to the identification of the target stored file to the read request. Then, the updated read request is redirected to the second disk management device. By means of this method, the read request can be quickly redirected to the second disk management device for processing.

In some embodiments, when the received access request is a write request from the user, the write request includes data of a file to be written. First disk management device 102 determines a storage location available to store the data of the file to be written from the plurality of disks. Then, the write request is updated by adding the storage location to the write request. First disk management device 102 redirects the updated write request to the second disk management device. By means of this method, the write request can be quickly redirected to the second disk management device for processing.

In some embodiments, first disk management device 102 determines whether the first access engine is available after performing the above update on the access request from the user. If it is unavailable, the updated access request is redirected to the second disk management device for processing. If it is available, the first access engine is used directly for access processing.

In some embodiments, if the first access engine is unavailable, the access request obtained from the user may be directly redirected to the second disk management device, and then the access request is updated in the second disk management device. The above examples are only for describing the present disclosure, rather than specifically limiting the present disclosure.

In some embodiments, if the redirected access request received by the first disk management device is not an updated access request, the first disk management device performs an update operation on the access request. Then, the access operation is performed through the first access engine. If it is an updated access request, the access operation is directly performed through the first access engine. The above examples are only for describing the present disclosure, rather than specifically limiting the present disclosure.

By means of above method, effective data access can be performed when an access engine of a disk management device is unavailable, thus realizing a more stable access capability and improving the user experience.

Figure 4:
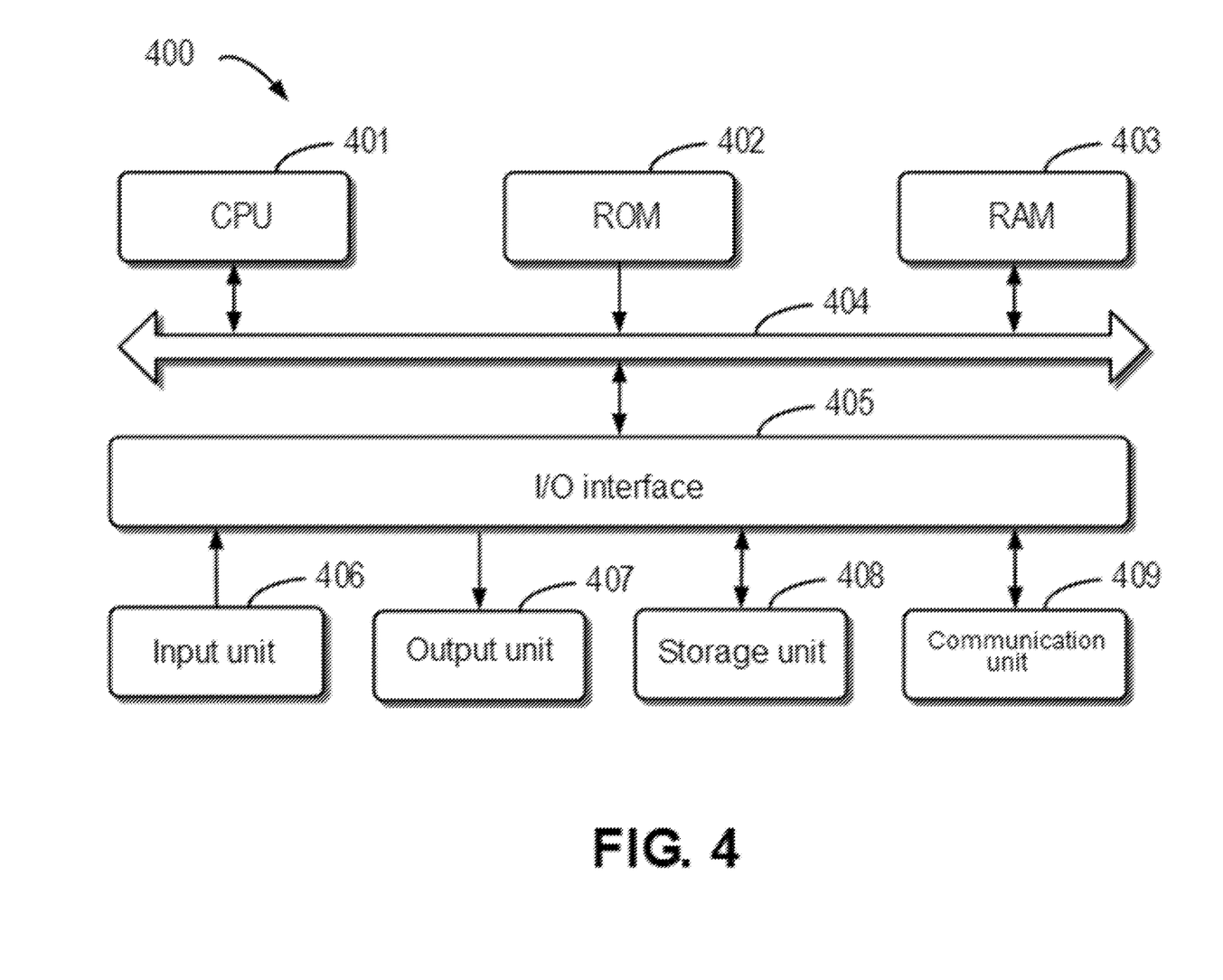
FIG. 4 is a schematic block diagram of example device 400 applicable to implementing the embodiments of the content of the present disclosure.

FIG. 4 is a schematic block diagram of example device 400 applicable to implementing the embodiments of the present disclosure. Disk management device 102 in FIG. 1 may be implemented using device 400. As shown in the drawing, device 400 includes central processing unit (CPU) 401 that may perform various appropriate actions and processing according to computer program instructions stored in read-only memory (ROM) 402 or computer program instructions loaded from storage page 408 to random access memory (RAM) 403. In RAM 403, various programs and data required for the operation of device 400 may further be stored. CPU 401, ROM 402, and RAM 403 are connected to each other through bus 404. Input/output (I/O) interface 405 is also connected to bus 404.

A plurality of components in device 400 are connected to I/O interface 405, including: input unit 406, such as a keyboard or a mouse; output unit 407, such as various types of displays and speakers; storage page 408, such as a magnetic disk and an optical disc; and communication unit 409, such as a network card, a modem, or a wireless communication transceiver. Communication unit 409 allows device 400 to exchange information/data with other devices over a computer network such as the Internet and/or various telecommunication networks.

The various processes and processing described above, for example, method 200, may be performed by processing unit 401. For example, in some embodiments, method 200 may be implemented as a computer software program that is tangibly included in a machine-readable medium such as storage unit 408. In some embodiments, some or all of the computer program may be loaded and/or installed onto device 400 through ROM 402 and/or communication unit 409. When the computer program is loaded into RAM 403 and executed by CPU 401, one or more actions of method 200 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in one programming language or any combination of several programming languages, including an object oriented programming language, such as Smalltalk and C++, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. When a remote computer is involved, the remote computer may be connected to a user computer through any kind of network, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing state information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program product implemented according to the embodiments of the present disclosure. It should be understood that each block of the flowcharts and/or block diagrams and combinations of blocks in the flowcharts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed basically in parallel, and sometimes they may also be executed in an inverse order, which depends on the functions involved. It should be further noted that each block in the block diagrams and/or flowcharts as well as a combination of blocks in the block diagrams and/or flowcharts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

What is claimed is:

1. A method, comprising:
   receiving, at a first time at a first disk management device comprising a processor and operating as part of a storage system, a first access request for accessing data in a plurality of disks associated with the storage system, wherein the first access request identifies a first file;
   acquiring a list of available access engines and a list of unavailable access engines;
   based on the list of available access engines and the list of unavailable access engines, determining that a first access engine, for accessing the plurality of disks in the first disk management device, is available at the first time;
   in response to the first access engine being determined to be available at the first time, adding a first storage location, within the storage system and corresponding to the file, to the first access request, resulting in an updated access request;
   receiving, at a second time at the first disk management device, a second access request for accessing the data in the plurality of the disks associated with the storage system, wherein the second access request identifies a second file;
   based on the list of available access engines and the list of unavailable access engines, determining that the first access engine is unavailable at the second time; and
   redirecting the second access request to a second disk management device in the storage system, without adding a second storage location to the second access request, in response to the first access engine being determined to be unavailable at the second time, wherein a second access engine in the second disk management device is available to access the plurality of disks.

2. The method according to claim 1, wherein the determining that the first access engine is unavailable comprises:
   monitoring a state of the first access engine and at least one other access engine other than the first access engine;
   based on a result of the monitoring indicating that the first access engine is unavailable, updating a state flag of the first access engine; and
   checking the state flag of the first access engine resulting in the determining that the first access engine is unavailable.

3. The method according to claim 1, further comprising:
   determining a workload of the first access engine, wherein the determining that the first access engine is unavailable is in response to determining that the workload exceeds a threshold workload.

4. The method according to claim 1, wherein the redirecting the second access request to the second disk management device in the storage system comprises:
   determining a group of disk management devices in the storage system that have access engines available to access the plurality of disks; and
   selecting a disk management device from the group of disk management devices and designating the disk management device as the second disk management device.

5. The method according to claim 1, further comprising:
in response to determining that the access request comprises an identification of a third disk management device in the storage system, determining that the first access engine is available.

6. The method according to claim 1, wherein the first access request is a read request comprising a first identification of the first file, and wherein the adding of the first storage location to the first access request comprises:
acquiring a mapping relationship between second identifications of stored files comprising the first file, and storage locations, comprising the first storage location, of the stored files;
searching the mapping relationship for a third identification of a target stored file corresponding to the first identification of the first file; and
updating the read request by adding a target storage location corresponding to the third identification of the target stored file to the read request, resulting in an updated read request wherein the updated read request is the updated access request.

7. The method according to claim 1, wherein the first access request is a write request comprising data of the first file, and wherein the adding of the first storage location to the first access request comprises:
determining, from the plurality of disks, the first storage location based on the first storage location being available to store the data of the first file; and
updating the write request by adding the first storage location to the write request, resulting in an updated write request, wherein the updated write request is the updated access request.

8. A first disk management device in a storage system, comprising:
at least one processor; and
a memory coupled to the at least one processor and having instructions stored thereon, wherein the instructions, when executed by the at least one processor, cause the first disk management device to perform operations comprising:
receiving an access request for accessing data in disks associated with the storage system, wherein the access request identifies a file, stored by the storage system, corresponding to the data;
acquiring a list of available access engines and a list of unavailable access engines;
based on the list of available access engines and the list of unavailable access engines, determining whether a first access engine, usable to access the disks in the first disk management device when available, is unavailable;
based on the first access engine being determined to be available, adding a storage location, in the storage system and corresponding to the file, to the access request, resulting in an updated access request; and
redirecting the access request to a second disk management device in the storage system, without adding the storage location to the access request, based on determining that the first access engine is unavailable, wherein a second access engine in the second disk management device, determined to be in the list of available access engines, is available to access the disks.

9. The first disk management device according to claim 8, wherein the first access engine and the second access engine are part of a group of access engines that are configured to be able to access the disks when available, and wherein the operations further comprise:
monitoring a state of the first access engine and at least one other access engine; and
updating a state flag of the first access engine in response to determining the first access engine is unavailable, wherein the determining whether the first access engine is unavailable comprises checking the state flag of the access engine.

10. The first disk management device according to claim 8, wherein the determining whether the first access engine is available comprises:
determining a workload of the first access engine; and
determining that the first access engine is unavailable in response to determining that the workload exceeds a threshold workload.

11. The first disk management device according to claim 8, wherein the redirecting the access request to the second disk management device in the storage system comprises:
determining a group of disk management devices in the storage system that have access engines available to access the disks; and
selecting a disk management device from the group of disk management devices and assigning the disk management device as the second disk management device.

12. The first disk management device according to claim 8, wherein the access request is a read request comprising a first identification of the file, and wherein the adding of the storage location to the access request comprises:
acquiring a mapping relationship between second identifications of stored files comprising the file, and storage locations, comprising the storage location of the stored files;
searching the mapping relationship for a third identification of a target stored file corresponding to the first identification of the file; and
updating the read request by adding a target storage location corresponding to the third identification of the target stored file to the read request, resulting in an updated read request, wherein the updated read request is the updated access request.

13. The first disk management device according to claim 8, wherein the access request is a write request comprising data of the file, and wherein the redirecting adding of the storage location to the access request comprises:
determining, from the disks, the storage location based on the storage location being available to store the data of the file; and
updating the write request by adding the storage location to the write request, resulting in an updated write request, wherein the updated write request is the updated access request.

14. A computer program product tangibly stored on a non-transitory computer-readable medium and comprising machine-executable instructions, wherein the machine-executable instructions, when executed by a first disk management device in a storage system, cause a machine to perform operations, comprising:
receiving an access request for accessing data in disks associated with the storage system the data being associated with a file that is stored by the storage system and identified in the access request;
acquiring a list of available access engines and a list of unavailable access engines;

based on the list of unavailable access engines, determining whether a first access engine, usable to access the disks in the first disk management device, is unavailable;

in response to the first access engine being determined to be available, adding a storage location, within the storage system and corresponding to the file, to the access request, resulting in an updated access request; and in response to the first access engine being determined to be unavailable:
- based on the list of available access engines, determining that a second access engine, in a second disk management device in the storage system, is available to access the disks; and
- redirecting the access request to the second disk management device in the storage system, without adding the storage location to the access request, in response to the determining that the second access engine is available.

15. The computer program product according to claim 14, wherein the determining whether the first access engine is unavailable comprises:

at least one of:
- acquiring state information of the first access engine, or determining a workload of the first access engine; and at least one of:
- determining that the state information indicates that the first access engine has a fault, resulting in the determining that the first access engine is unavailable, or
- determining that the workload exceeds a threshold workload, resulting in the determining that the first access engine is unavailable.

16. The computer program product according to claim 14, wherein the redirecting the access request to the second disk management device in the storage system comprises:
- determining a group of disk management devices in the storage system that have access engines available to access the disks; and
- selecting a disk management device from the group of disk management devices and assigning the disk management device as the second disk management device.

17. The computer program product according to claim 14, wherein the determining whether the first access engine is unavailable comprises:
- in response to determining that the access request comprises an identification of a third disk management device in the storage system, determining that the first access engine is available.

18. The computer program product according to claim 14, wherein the access request is a read request comprising a first identification of the file, and wherein the adding of the storage location to the access request comprises:
- acquiring a mapping relationship between second identifications of stored files comprising the file, and storage locations of the stored files;
- searching the mapping relationship for a third identification of a target stored file corresponding to the first identification of the file; and
- updating the read request by adding a target storage location corresponding to the third identification of the target stored file to the read request, resulting in the updated access request.

19. The computer program product according to claim 14, wherein the access request is a write request comprising data of the file, and wherein the adding of the storage location to the access request comprises:
- determining, from the disks, the storage location based on the storage location being available to store the data of the file; and
- updating the write request by adding the storage location to the write request, resulting in the updated access request.

20. The method according to claim 7, wherein the storage location is a first storage location, wherein the updated access request is a first updated access request, and wherein the method further comprises:
- determining, from the plurality of disks, a second storage location based on the second storage location being available to store the data of the file; and
- generating a second updated access request by adding the second storage location to the write request.

* * * * *